Jan. 30, 1940.   F. W. MARCO   2,188,689
VEHICLE SPRING
Filed May 28, 1937   3 Sheets-Sheet 1
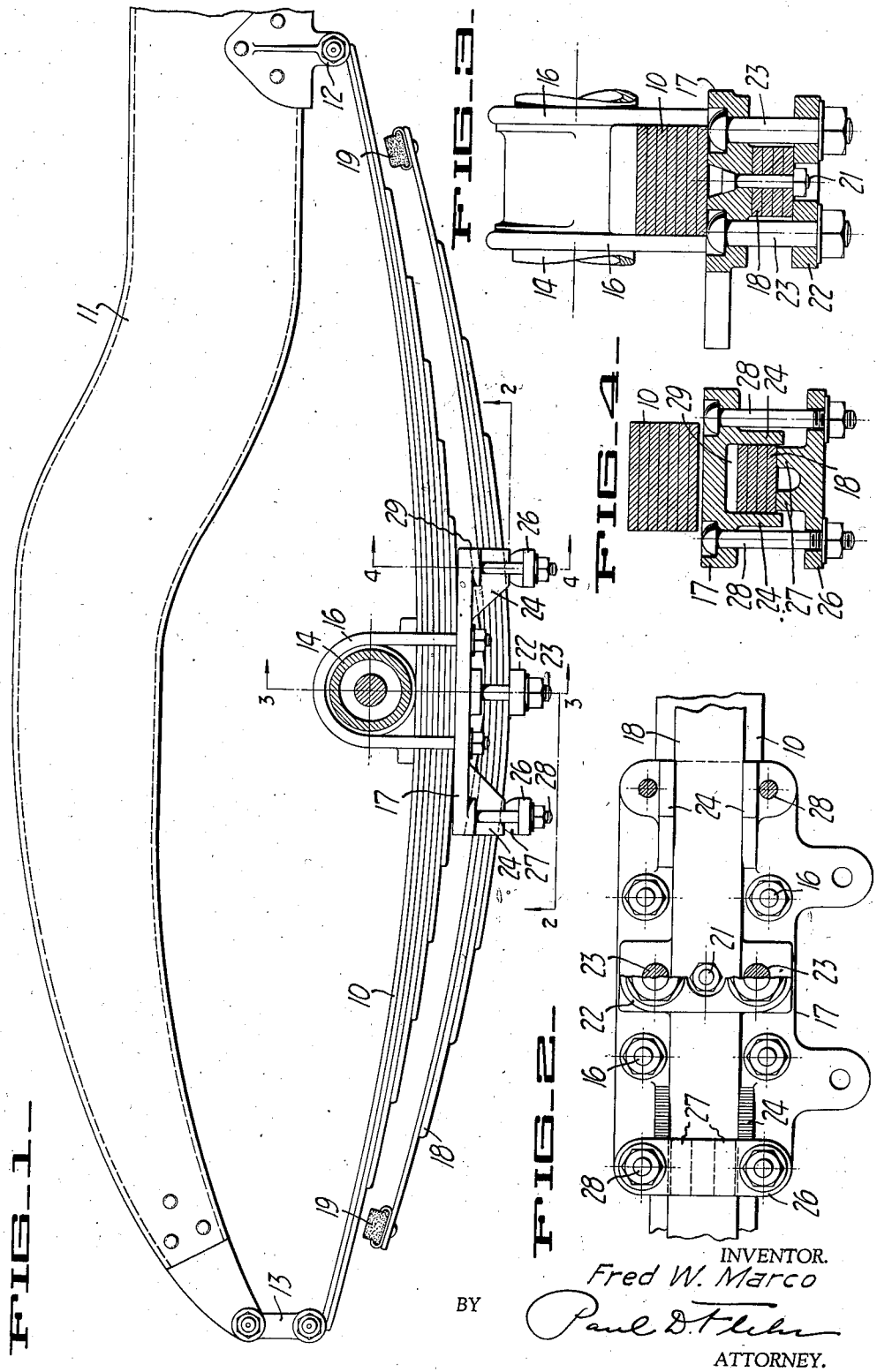
INVENTOR.
Fred W. Marco
BY
ATTORNEY.

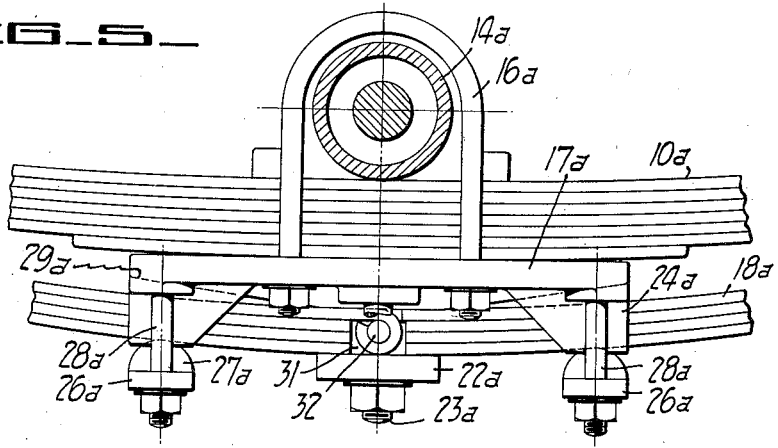
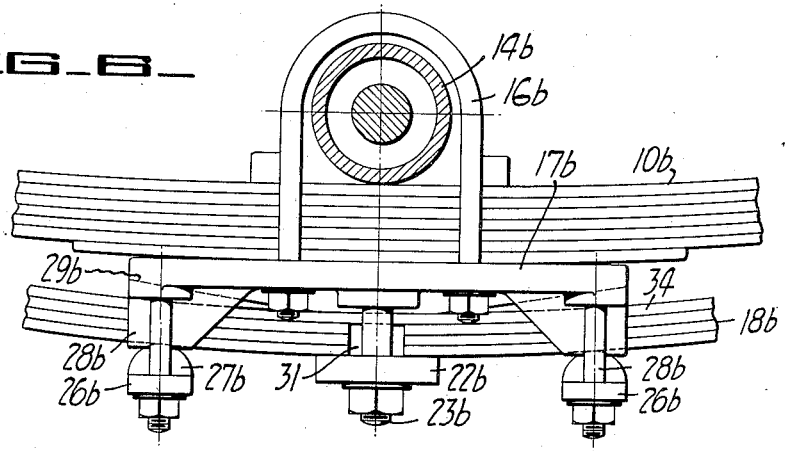
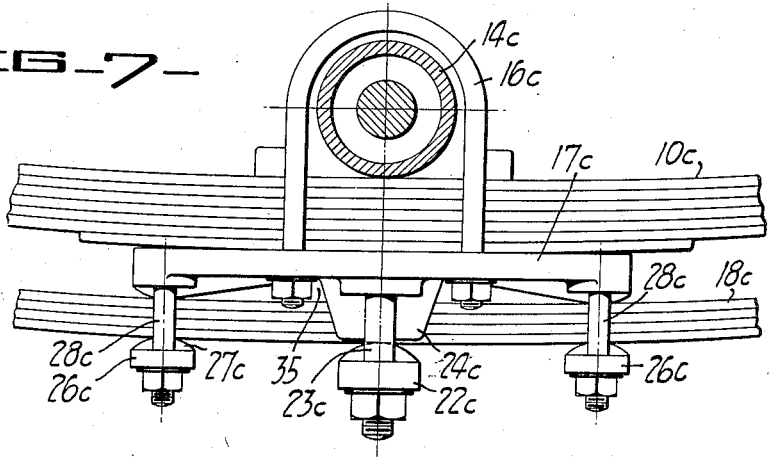

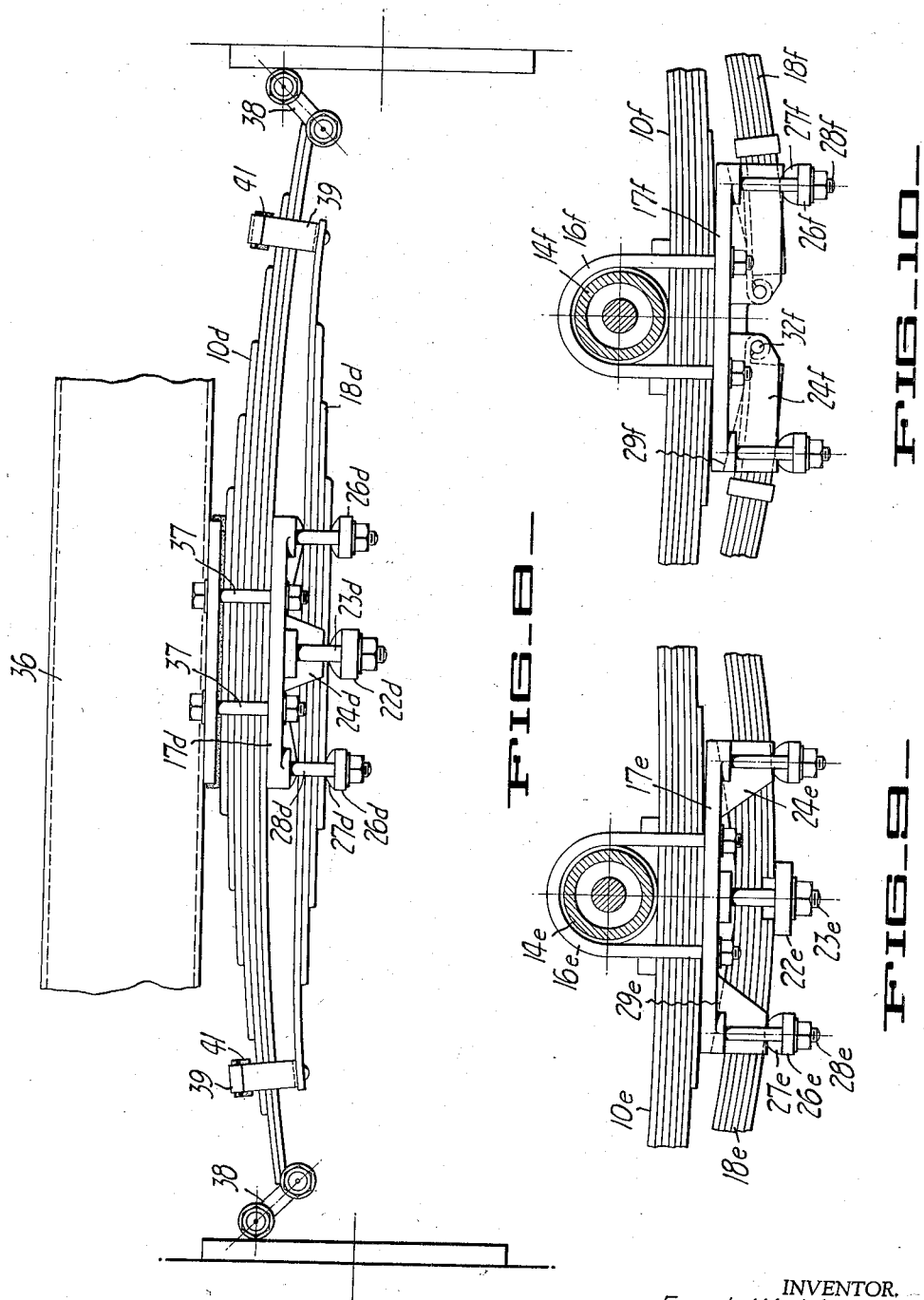

Patented Jan. 30, 1940

2,188,689

UNITED STATES PATENT OFFICE 2,188,689

VEHICLE SPRING

Fred W. Marco, Berkeley, Calif., assignor to Laher Spring & Tire Corp., Oakland, Calif., a corporation of Oregon Application May 28, 1937, Serial No. 145,271

10 Claims. (Cl. 267—45)

This invention relates generally to the construction of spring suspension means for road vehicles. More specifically it applies to the construction of so-called helper springs, which enable a vehicle having more or less conventional leaf springs to carry heavier loads than originally intended.

It is a primary object of the invention to provide a so-called helper or overload spring construction, which can be readily adjusted to suit varying load conditions.

Another object of the invention is to provide a spring construction of the above character which will be comparatively universal in its application. I have particular reference to adaptability of the device to different makes and types of vehicles, such as various makes of automobiles and trucks, and various types of trailers.

A further object of the invention is to provide a helper spring which can be installed with a minimum amount of labor.

Additional objects of the invention will appear from the following description in which several embodiments of the invention have been set forth in detail in conjunction with the accompanying drawings.

Referring to the drawings:

Fig. 1 is a side elevational view, illustrating a vehicle spring of the half elliptical leaf type, which has been equipped with a helper spring in accordance with the present invention.

Fig. 2 is a cross-sectional detail, taken along the line 2—2 of Fig. 1.

Fig. 3 is a cross-sectional detail, taken along the line 3—3 of Fig. 1.

Fig. 4 is a cross-sectional detail, taken along the line 4—4 of Fig. 1.

Fig. 5 is a side elevational detail, illustrating a modified form of the invention.

Fig. 6 is a side elevational detail, illustrating another modified form of the invention.

Fig. 7 is a side elevational detail, illustrating another modified form of the invention.

Fig. 8 is a side elevational view similar to Fig. 1, but showing application of the invention to a vehicle spring of the type extending laterally of the vehicle.

Fig. 9 is a side elevational view showing a modification similar to Fig. 6, but employing only a minor number of divided leaves.

Fig. 10 is a side elevational view showing a modification somewhat similar to Fig. 5, but incorporating two separate hinge connections.

Referring first to that form of the invention illustrated in Fig. 1, I have shown a more or less conventional spring 10 of the half elliptical leaf type. The ends of the spring are attached to the vehicle frame 11 by the conventional connections 12 and 13. The medial part of spring 10 is ordinarily attached to the vehicle axle housing 14, by means of U bolts 16. The lower ends of the U bolts 16 ordinarily engage a clamping plate which is thus clamped against the under side of the spring.

In applying the present invention the conventional clamping plate referred to above is removed, and instead a special plate 17 is applied. Carried by this plate 17 there is a helper spring 18 of the half elliptical leaf type. The ends of this helper spring carry rubber pads 19, or equivalent means, for engaging the end portions of the spring 10.

The attachment of the helper spring 18 to the plate 17, is of such a character that the no-load position of the ends of the helper spring can be adjusted, thereby accommodating the arrangement to different vehicle loads. In the arrangement of Figs. 1 to 4 inclusive a relatively small bolt or rivet 21 passes through the leaves of spring 18, and serve to retain the spring in assembled relationship with respect to the clamping plate 17. In the same region the under side of spring 18 is engaged by the clamping strap or bar 22, the ends of which are attached to the clamping plate 17, by the bolts 23. Near the ends of the clamping plate 17, and depending from the lower side of the same, are the spaced webs 24. These webs extend along the sides of the helper spring 18, and serve to retain the helper spring in proper aligned position below the main vehicle spring 10.

The lower side of the helper spring 18 is also engaged by the clamping straps or bars 26, which have pads 27 capable of passing upwardly between the ribs 24. Clamping bars 26 are adjustably connected to the plates 17, by the bolts 28. The lower face of the plate 17 is relieved or cut away as indicated at 29, so that the helper spring can be sprung by varying degrees, depending upon the tension applied by bolts 28.

The device described above operates as follows: After installing the helper springs upon a vehicle in the manner described, one adjusts the device in accordance with the load which the vehicle is being called upon to carry. For example with a given installation and with a helper spring construction of a given design, the helper spring may be capable of carrying overloads up to six hundred pounds. Depending upon the amount of the overload which one desires to carry, bolts 28 are tightened accordingly, so that for a given overload the end portions of the vehicle spring 10 will be in part supported by the ends of the helper spring 18. The arrangement has maximum load carrying capacity when the bolts 28 are tightened to the fullest extent possible. Similarly when the bolts 28 have been loosened, the arrangement will be of minimum or negligible assistance to the carrying of overloads.

The universal character of the arrangement described above, will be apparent to those skilled in the art. A large number of motor vehicles including automobiles and light trucks, are equipped with springs of the general character illustrated in Fig. 1. As previously described, to make an installation it is only necessary to remove the nuts from the U bolts 16, and to replace the conventional clamping plates with the plates 17 of the present device. After making this installation one merely properly adjusts the bolts 28, for the amount of overload carrying capacity desired. From time to time this adjustment can be quickly varied.

My device is well adapted for application to the rear springs of automobiles, which are to be equipped with trailers. Knowing the overload which will be applied to the rear springs of the car, one can readily apply my devices, and so adjust them as to provide for the overload without danger of spring breakage. However, the invention is equally applicable to a variety of road vehicles, such as trucks, trailers, etc. The arrangement is quiet because of the rubber pads 19, and in general it affords relatively easy riding.

In the modification of Fig. 5, the lower leaves of the helper spring 18a are divided, to afford the medial gap 31. The upper leaf of the spring is formed in two portions, connected together by a hinge 32. The two parts of the helper spring are clamped to the plate 17a, by means of clamping bars 22a and bolts 23a. The object of this arrangement is to facilitate adjustment of bolts 28a, to suit varying overload conditions. It will be evident that with this arrangement one can readily make adjustments simply by slightly loosening bolts 23a, followed by desired adjustment of the bolts 28a. During adjustment of bolts 28a the two parts of the helper spring 18a will assume the different desired positions, with relative movement between the two halves of the helper spring being accommodated by hinging action. The parts designated by numerals 14a, 16a, 17a, 26a, 27a and 29a of Fig. 5, correspond generally to parts numbered 14, 16, 17, 26, 27 and 29 of Figs. 1 to 4 inclusive.

The modification of Fig. 6 is somewhat similar to that of Fig. 5, except that in this instance instead of having a hinged connection between the two parts of the helper spring, the two parts of the helper spring 18b are connected together by means of a continuous top leaf 34. Here bending of the top leaf takes the place of the hinge action in Fig. 5. The parts designated by numerals 10b, 14b, 16b, 17b, 22b, 23b, 26b, 27b, 28b and 29b in Fig. 6, correspond generally to parts designated by numerals 10, 14, 16, 17, 22, 23, 26, 27, 28 and 29 of Figs. 1 to 4 inclusive.

In the modification of Fig. 7 the arrangement is such that bolts are tightened to accommodate the device to a decrease in overload. Thus in this instance the clamping bars 26c and the bolts 28c tightly clamp spaced portions of the helper spring to the clamping plate 17c. The central portion of the spring is engaged by the strap 22c, the position of which is adjusted by the bolts 23c. Between the center of the helper spring and the lower side of plate 17c, there is a gap or space 35, whereby the central portion of the helper spring can be sprung upwardly. It is apparent that in this modification one loosens the bolts 23c in order to increase the overload carrying capacity. Conversely one tightens the bolts 23c, in order to decrease the overload carrying capacity. The parts designated by numerals 10c, 14c, 16c, 18c, 24c and 27c of Fig. 7, correspond generally to parts designated by numerals 10, 14, 16, 18, 24 and 27 of Figs. 1 to 4 inclusive.

Fig. 8 illustrates a modification suitable for half elliptical springs, which extend laterally instead of longitudinally of the vehicle. Thus in this instance the vehicle spring 10d has its central portion clamped to the frame 36, by means of bolts 37, while the ends of the spring connect with the shackles 38. Ordinarily the bolts 37 engage a conventional clamping plate on the underside of the spring 10d, and in installing the present invention this conventional plate is removed and the plate 17d applied. The helper spring 18d is mounted upon the plate 17d, substantially in the manner illustrated and described with respect to Fig. 7. Attached to the ends of the helper spring 18d are the yokes 39, which loosely embrace the end portions of the spring 10d, and which are provided with rubber contact pads 41. It will be evident that with this arrangement an increase in overload carrying capacity is obtained by tightening the bolts 23d. The parts designated by numerals 22d, 24d, 26d, 27d and 28d in Fig. 8, correspond generally to the parts designated by numerals 22, 24, 26, 27 and 28 of Figs. 1 to 4 inclusive.

Referring to the forms of the invention shown in Figs. 1, 7 and 8, it has been explained that all the leaves of the helper spring are sprung varying amounts, to accommodate varying overloads. Where the helper springs may be called upon for heavy duty service, necessitating a large number of leaves, the starter leaves may be divided in order to avoid undue stiffness such as might make it difficult if not impossible to make adjustments. Such an arrangement is shown in Fig. 9, in which four of the leaves of the helper spring function substantially as in Fig. 1, which two (or more) extra leaves are divided. The parts in Fig. 9 designated by numerals 10e, 14e, 16e, 17e, 18e, 22e, 23e, 24e, 26e, 27e, 28e and 29e correspond generally with the parts designated by numerals 10, 14, 16, 17, 18, 22, 23, 24, 26, 27, 28 and 29 of Figs. 1 to 4 inclusive.

In the modification of Fig. 5, the two parts of the spring are connected together by a hinge. A modification of this arrangement is shown in Fig. 10. In this instance the two duplicate quarter-elliptical helper springs 18f have separate hinge connections 32f with the plate 17f. Webs 24f retain the two helper springs in proper position. This modification operates substantially the same as the form shown in Fig. 5, and changing the setting of bolts 28f varies the adjustment for different overloads. The parts designated by numerals 14f, 16f, 18f, 26f, 27f, 28f and 29f of Fig. 10, correspond generally to parts designated by numerals 14, 16, 18, 26, 27, 28 and 29 of Figs. 1 to 4 inclusive.

I claim:

1. In a device for application to a vehicle spring of the semi-elliptical leaf type, for increasing its effective load carrying capacity, the vehicle spring being characterized by means at one end of the same for connection with the vehicle and also by means attached to one medial portion of the spring for clamping one side of the spring against a part of the vehicle, a supplemental helper spring of the semi-elliptical leaf type, mounting means including said clamping means for attaching a portion of said helper spring to the other side of the vehicle spring, whereby an end portion of the helper spring is disposed to resist deflection of the vehicle spring under its load, and means incorporated with said mounting means for adjusting the normal position of said end of the helper spring relative to the vehicle spring, thereby adjusting the same to different vehicle loads.

2. In a device for application to a vehicle spring of the semi-elliptical leaf type for increasing its effective load carrying capacity, the vehicle spring being characterized by means at the ends of the same for connection with the vehicle and a clamp plate attached to the medial portion of the spring for attaching the same to a vehicle, a supplemental helper spring of the half elliptical leaf type, mounting means including said clamp plate for attaching the medial portion of said helper spring to the medial portion of the vehicle spring, whereby the end portions of the helper spring are disposed to resist the deflection of the vehicle spring under a load, and means incorporated with said mounting means for adjusting the normal position of the ends of the helper spring relative to the vehicle spring, thereby adjusting the same to different vehicle loads.

3. In vehicle spring equipment of the character described, for application to a vehicle spring of the half elliptical leaf type, where the vehicle spring has its ends adapted for attachment to one part of a vehicle and has its medial portion clamped to another part of the vehicle by means of bolts, a clamping plate engaged by said bolts and serving to retain the vehicle spring upon said last named vehicle part, one face of the plate engaging one side of the spring, a helper spring of the half elliptical leaf type, said helper spring having one side of the same engaging the other face of said clamping plate, means including bolts for clamping said helper spring to said plate, with the ends of the helper spring disposed to resist deflection of the vehicle spring under loads, and additional clamping means carried by said plate and engaging said helper spring, for bending the medial portion of the helper spring to thereby adjust the normal position of the ends of the helper spring relative to the vehicle spring, whereby the same is adjusted to different vehicle loads.

4. In a device for application to a vehicle spring of the semi-elliptical leaf type, for increasing its effective load carrying capacity, a clamp for attachment to the vehicle spring, a supplemental helper spring of the half elliptical leaf type, means for securing the medial portion of the helper spring to the vehicle adjacent the medial portion of the vehicle spring with said clamp interposed between said springs, the helper spring being formed of two parts hingedly coupled together, and means for adjusting the spring to different vehicle loads.

5. In a device for application to a vehicle spring of the half elliptical leaf type, for increasing its effective load carrying capacity, the vehicle spring being characterized by means at the ends of the same for connection with the vehicle and also by means attached to the medial portion of the spring for clamping one side of the spring against a part of the vehicle, a supplemental helper spring of the half elliptical leaf type, mounting means including said clamping means for attaching the medial portion of said helper spring to the other side of the vehicle spring, whereby the end portions of the helper spring are disposed to resist deflection of the vehicle spring under a load, and means incorporated with said mounting means for bending its medial portion to adjust the normal position of the ends of the helper spring relative to the vehicle spring, thereby adjusting the same to different vehicle loads.

6. In a vehicle spring equipment of the character described, for application to a vehicle spring of the semi-elliptical leaf type, where the vehicle spring has at least one end of the same adapted for attachment to one part of the vehicle and has one portion thereof clamped to another part of the vehicle by means of bolts, a clamping plate engaged by said bolts and serving to retain the vehicle spring upon said last named vehicle part, one face of the plate engaging one side of the vehicle spring, a helper spring of the semi-elliptical leaf type, said helper spring being disposed adjacent the other face of said clamping plate and having one end of the same disposed to resist deflection of the vehicle spring under loads, and means serving to clamp said helper spring to said plate and to enable adjustments of the helper spring with respect to the vehicle spring.

7. In a vehicle spring equipment of the character described, for application to a vehicle spring of the semi-elliptical leaf type, where the vehicle spring has at least one end of the same adapted for attachment to one part of the vehicle and has one portion thereof clamped to another part of the vehicle by means of bolts, a clamping plate engaged by said bolts and serving to retain the vehicle spring upon said last named vehicle part, one face of the clamping plate engaging one side of the vehicle spring, a helper spring of the semi-elliptical leaf type, said helper spring being disposed adjacent the other side of the clamping plate, means serving to clamp said helper spring to said other side of said plate with one end of the helper spring disposed to resist deflection of said one end of the vehicle spring, and additional means for effecting adjustment of the helper spring relative to the vehicle spring, thereby adjusting the same for different vehicle loads.

8. In a vehicle spring equipment of the character described, for application to a vehicle spring of the semi-elliptical leaf type, where the vehicle spring has at least one end of the same adapted for attachment to one part of the vehicle and has one portion thereof clamped to another part of the vehicle by means of bolts, a clamping plate engaged by said bolts and serving to retain the vehicle spring upon said last named vehicle part, one face of the clamping plate engaging one side of the vehicle spring, a helper spring of the semi-elliptical leaf type, said helper spring being disposed adjacent the other side of the clamping plate, means serving to clamp said helper spring to said other side of said plate with one end of the helper spring disposed to resist deflection of said one end of the vehicle spring, and additional means for effecting adjustment of the helper spring relative to the vehicle spring, thereby adjusting the same for different vehicle loads, said last named means being mounted upon said plate.

9. In a vehicle spring equipment of the character described, for application to a vehicle spring of the half-elliptical leaf type, where the vehicle spring has its end adapted for attachment to one part of the vehicle, and has its medial portion attached to another part of the vehicle by means of bolts, a clamping plate engaged by said bolts and serving to retain the vehicle spring upon said last named vehicle part, one face of the plate engaging one side of the spring, a helper spring of the half-elliptical leaf type, said helper spring having one side of the same engaging the other side of said clamping plate, and means for clamping said helper spring to said plate, with the ends of the helper spring disposed to resist deflection of the vehicle spring under loads, and also for adjusting the normal position of the ends of the helper spring relative to the vehicle spring.

10. In a vehicle spring equipment of the character described, for application to a vehicle spring of the half-elliptical leaf type, where the vehicle spring has its end adapted for attachment to one part of the vehicle, and has its medial portion attached to another part of the vehicle by means of bolts, a clamping plate engaged by said bolts and serving to retain the vehicle spring upon said last named vehicle part, one face of the plate engaging one side of the spring, a helper spring of the half-elliptical leaf type, said helper spring having one side of the same engaging the other side of said clamping plate, and means for attaching said helper spring to said plate with the ends of the helper spring disposed to resist deflection of the vehicle spring under loads, and additional means carried by said plate and engaging the helper spring for adjusting the normal position of the ends of the helper spring relative to the vehicle spring, whereby the same is adjusted to different vehicle loads.

FRED W. MARCO.